(12) United States Patent
Addepalli et al.

(10) Patent No.: US 8,738,944 B2
(45) Date of Patent: May 27, 2014

(54) ENERGY-BASED FEEDBACK FOR TRANSMISSION RECEPTION IN A COMMUNICATION NETWORK

(75) Inventors: Sateesh K. Addepalli, San Jose, CA (US); Raghuram S. Sudhaakar, Mountain View, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 13/297,912

(22) Filed: Nov. 16, 2011

(65) Prior Publication Data

US 2013/0124883 A1 May 16, 2013

(51) Int. Cl.
*G06F 1/00* (2006.01)
(52) U.S. Cl.
USPC ............................................................ 713/310
(58) Field of Classification Search
USPC .................................................. 713/300–340
See application file for complete search history.

(56) References Cited

U.S. PATENT DOCUMENTS

| | | | | | |
|---|---|---|---|---|---|
| 4,955,038 | A | * | 9/1990 | Lee et al. ....................... | 375/256 |
| 5,487,179 | A | * | 1/1996 | Larsson .......................... | 455/69 |
| 6,018,650 | A | | 1/2000 | Petsko et al. | |
| 6,408,165 | B1 | | 6/2002 | Raissinia et al. | |
| 7,126,913 | B1 | | 10/2006 | Patel et al. | |
| 7,286,845 | B2 | * | 10/2007 | Boariu et al. .................. | 455/522 |
| 7,395,444 | B2 | * | 7/2008 | Ives ................................ | 713/340 |
| 7,412,338 | B2 | * | 8/2008 | Wynans et al. ................. | 702/61 |
| 7,600,139 | B2 | * | 10/2009 | Ang ............................... | 713/320 |
| 7,825,818 | B2 | * | 11/2010 | Yoon .............................. | 340/636.1 |
| 7,860,198 | B2 | * | 12/2010 | Montalbano ................... | 375/346 |
| 7,945,797 | B2 | * | 5/2011 | Matton et al. .................. | 713/324 |
| 8,127,158 | B2 | * | 2/2012 | Jessup et al. ................... | 713/300 |
| 8,169,185 | B2 | * | 5/2012 | Partovi et al. .................. | 320/108 |
| 8,504,005 | B2 | * | 8/2013 | Tsui et al. ....................... | 455/418 |
| 2005/0163095 | A1 | | 7/2005 | Raleigh et al. | |
| 2007/0130610 | A1 | * | 6/2007 | Aarnio et al. .................. | 725/134 |
| 2007/0206547 | A1 | | 9/2007 | Gong et al. | |

(Continued)

FOREIGN PATENT DOCUMENTS

| | | |
|---|---|---|
| WO | WO-2009006188 A1 | 1/2009 |
| WO | WO-2011014348 A1 | 2/2011 |

OTHER PUBLICATIONS

Ba, et al., "Feasibility and Benefits of Passive RFID Wake-Up Radios for Wireless Networks", Universtity of Rochester, Department of Electrical and Computer Engineering, May 14, 2010, pp. 1-27.
Gu, et al., "Radio-Triggered Wake-Up for Wireless Sensor Networks", Real-Time Systems, vol. 29, Nos. 2-3, Mar. 2005, pp. 157-182.

(Continued)

*Primary Examiner* — Paul R Myers
(74) *Attorney, Agent, or Firm* — Edwards Wildman Palmer LLP; James M. Behmke; Jonathon P. Western

(57) ABSTRACT

In one embodiment, a communication device of a communication network determines its available power level, and also estimates a power requirement to receive an expected transmission from a transmitter of the communication network. By determining whether the available power level is sufficient for the estimated power requirement, the device may correspondingly provide feedback to the transmitter regarding whether the available power level is sufficient for the estimated power requirement (e.g., if insufficient, either ignoring the transmission or returning an explicit reply). In another embodiment, further power conservation may be afforded through a radio-triggered wake-up mechanism.

25 Claims, 16 Drawing Sheets

(56) References Cited

U.S. PATENT DOCUMENTS

| | | | |
|---|---|---|---|
| 2008/0281995 A1* | 11/2008 | Bae et al. | 710/16 |
| 2009/0254766 A1* | 10/2009 | Yamasuge | 713/300 |
| 2009/0284245 A1* | 11/2009 | Kirby et al. | 323/318 |
| 2012/0187925 A1* | 7/2012 | Martin et al. | 323/234 |
| 2012/0246493 A1* | 9/2012 | Bhesania et al. | 713/300 |

OTHER PUBLICATIONS

Kim, et al., "CMOS Passive Wake-Up Circuit for Sensor Network Applications", Microwave and Optical Technology Letters, vol. 52, Issue 3, Mar. 2010, pp. 597-600.

Winter, et al., "RPL: IPv6 Routing Protocol for Low Power and Lossy Networks", <draft-ietf-roll-rpl-19>, IETF Internet Draft, Mar. 13, 2011, pp. 1-164.

* cited by examiner

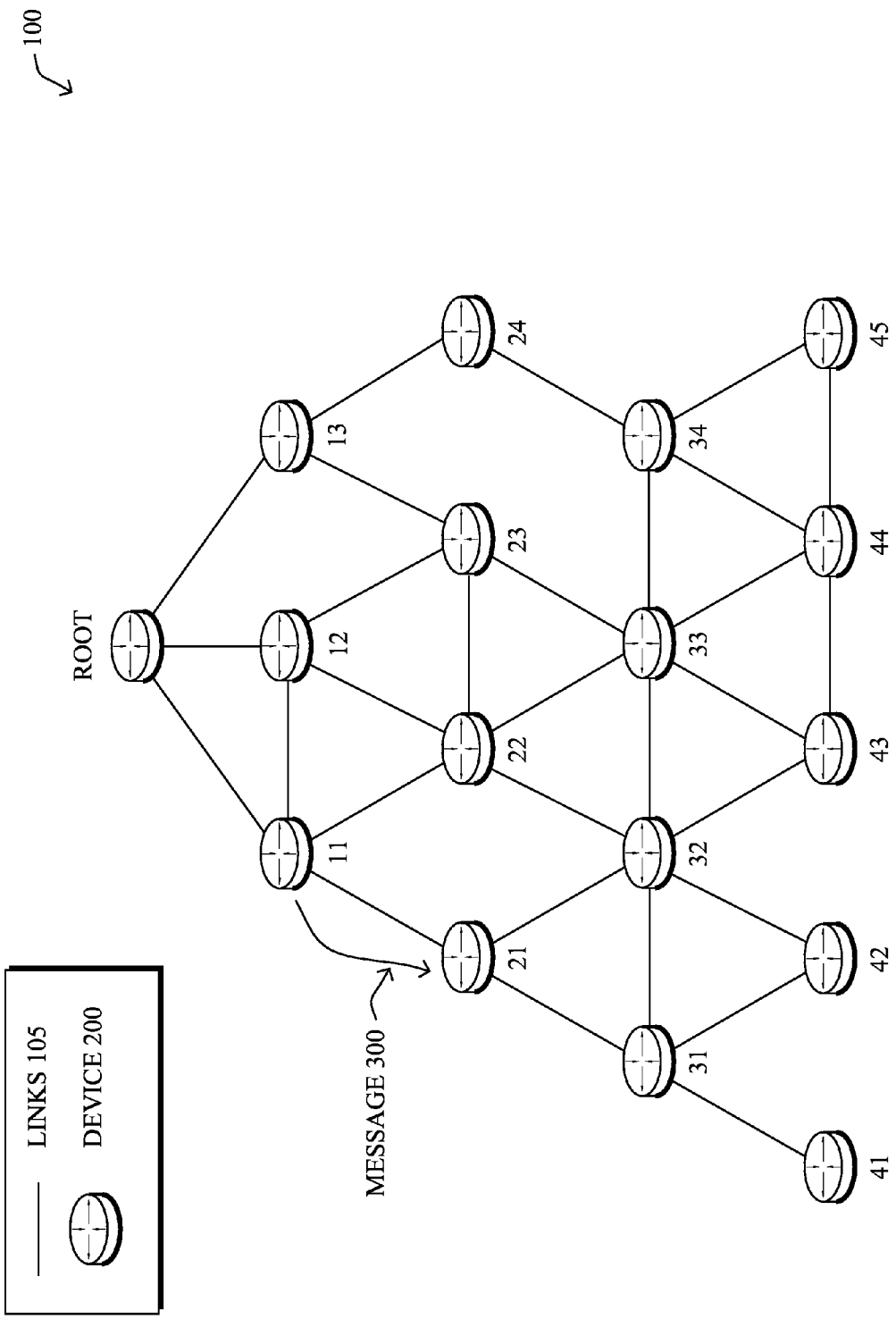

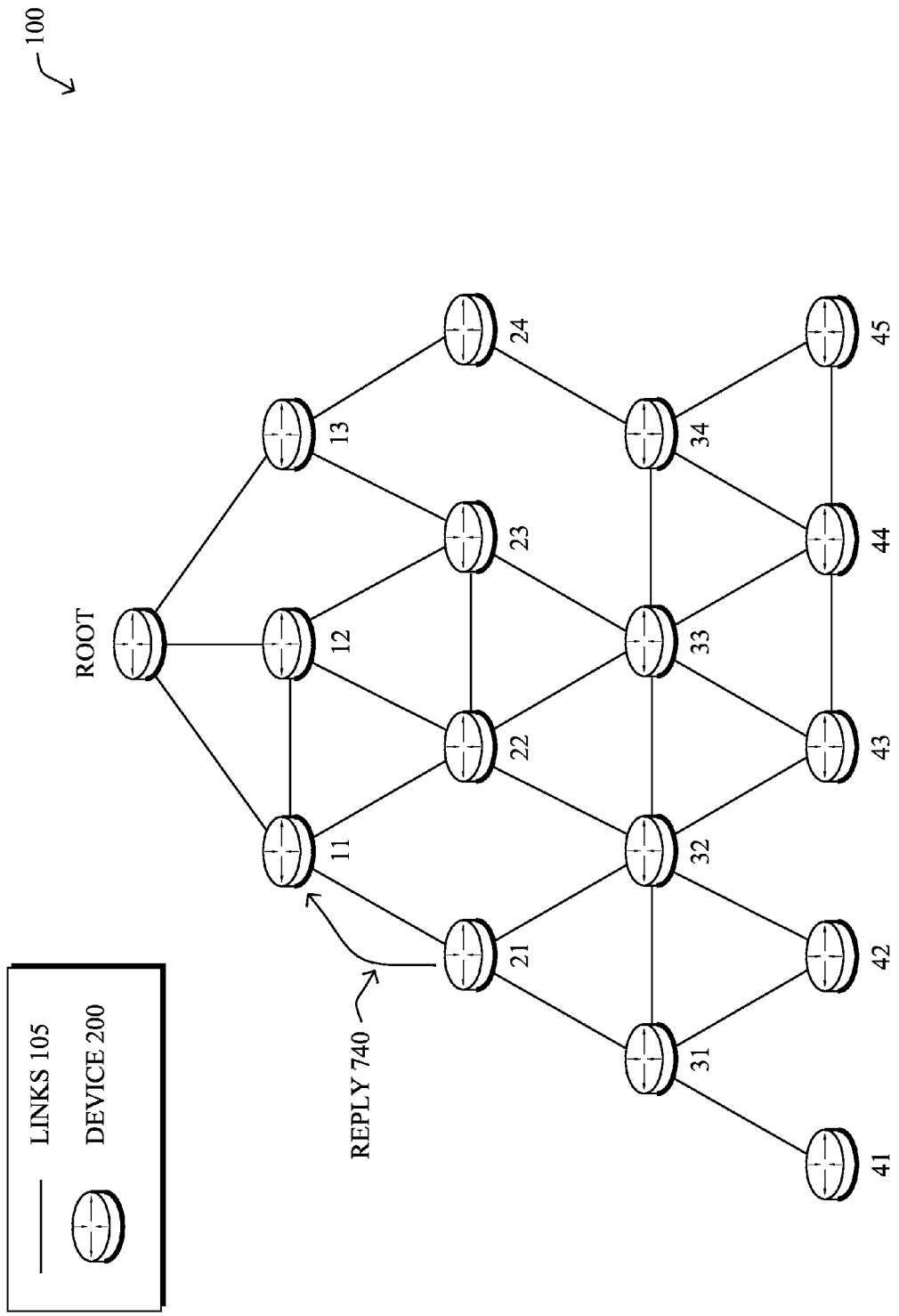

ENERGY-BASED FEEDBACK FOR TRANSMISSION RECEPTION IN A COMMUNICATION NETWORK

TECHNICAL FIELD

The present disclosure relates generally to communication networks, and, more particularly, to communication based on device energy levels.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. For instance, large scale deployment of sensor networks has always faced the problem of providing a sustainable energy source to the sensor devices to operate. Though certain LLNs do have devices that are main powered ("plugged in"), often devices in LLNs are battery operated or energy-harvesters (e.g., solar, wind, etc.). In addition, main powered devices may lose power (an outage), at which time backup power (e.g., batteries) must be used for an often indeterminate length of time. Accordingly, one of the most important challenges to deployment of LLNs is minimizing the energy requirements of the devices and sustaining operational levels of energy.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7C illustrate another example of feedback operation;

DESCRIPTION OF EXAMPLE EMBODIMENTS

Overview

Figure 1:
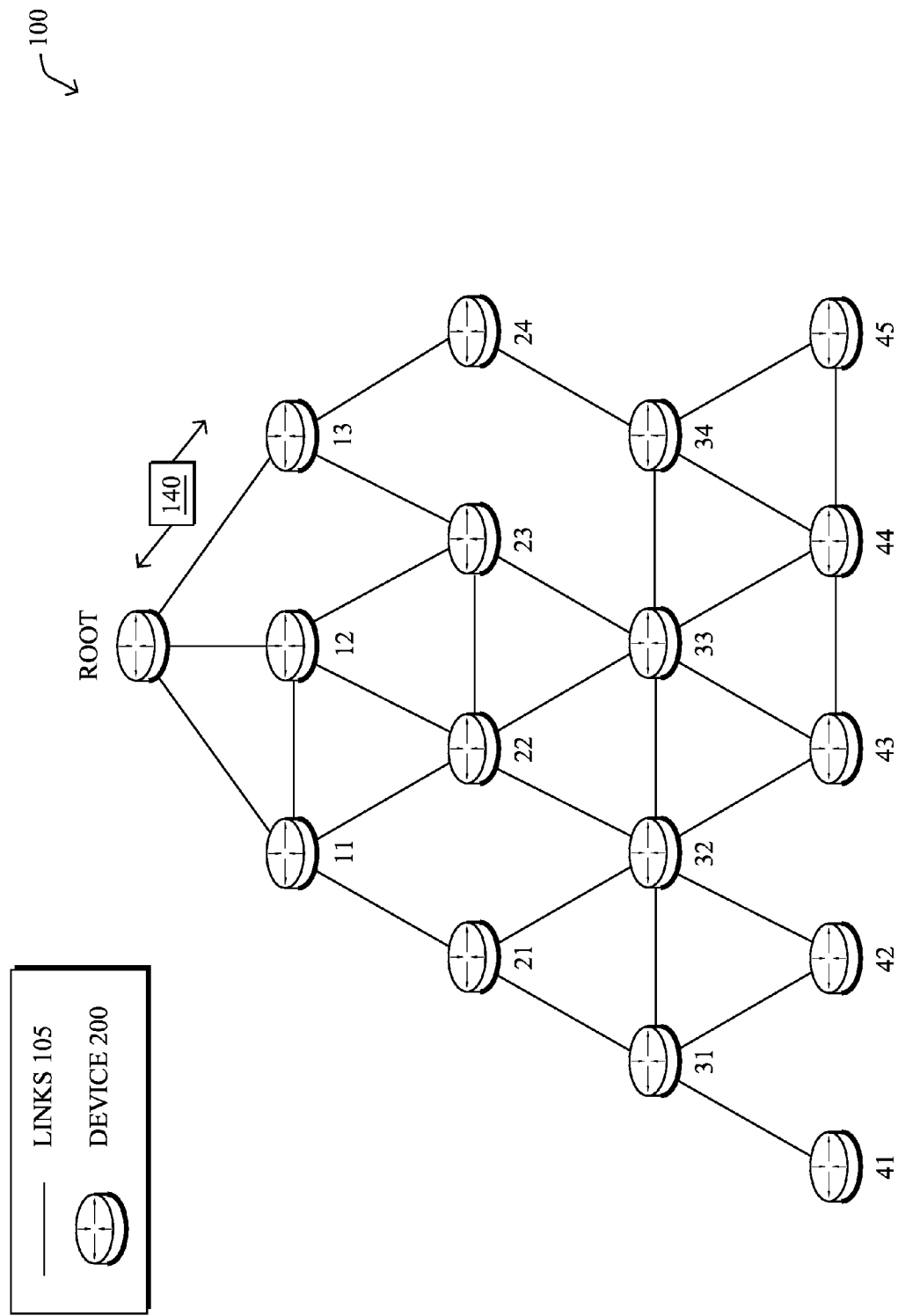
FIG. 1 illustrates an example communication network.

According to one or more embodiments of the disclosure, a communication device of a communication network determines its available power level, and also is estimates a power requirement to receive an expected transmission from a transmitter of the communication network. By determining whether the available power level is sufficient for the estimated power requirement, the device may correspondingly provide feedback to the transmitter regarding whether the available power level is sufficient for the estimated power requirement (e.g., if insufficient, either ignoring the transmission or returning an explicit reply). In another embodiment, further power conservation may be afforded through a radio-triggered wake-up mechanism.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Note that generally, though not necessarily, the energy-harvesting devices 200 are physically disconnected from power and physical communication lines, and communicate using wireless communication.

Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or is other shared-media protocols where appropriate. In this context, a protocol consists of a set of rules defining how the nodes interact with each other.

Figure 2:
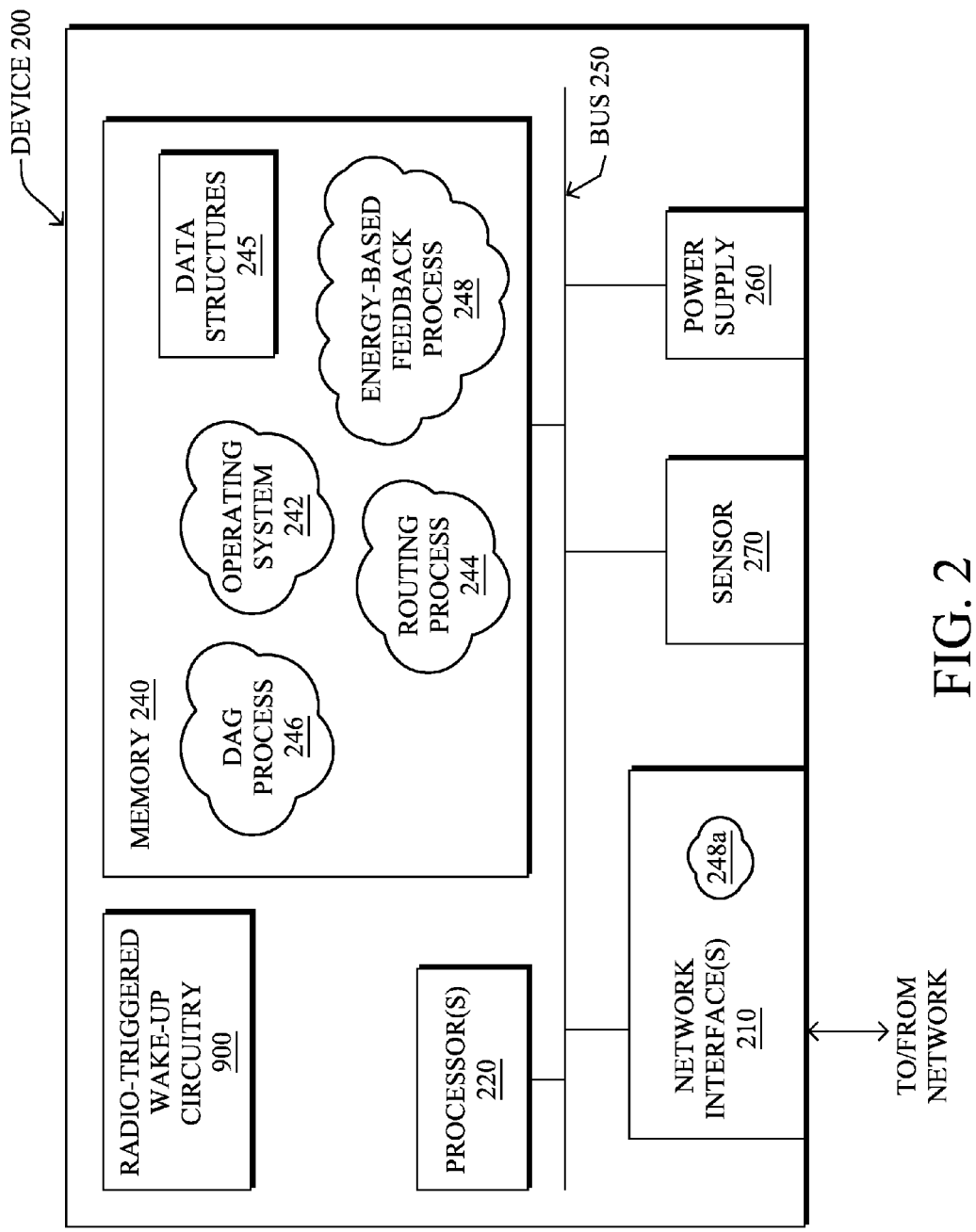
FIG. 2 illustrates an example network device/node.

FIG. 2 is a schematic block diagram of an example energy-harvesting node/device 200 in accordance with one or more illustrative embodiments herein. In general, the device may comprise one or more network interfaces 210 (e.g., wireless), at least one processor 220, and a memory 240 interconnected by a system bus 250 as well as a power supply 260 (e.g., battery, plug-in, energy-harvesting circuitry, etc.). In one embodiment, certain devices may have sensor circuitry 270 configured to measure a sensed value (e.g., voltage, temperature, motion, location, etc.). In addition, as described below, radio-triggered wake-up circuitry 900 may also be present in the device 200 in certain embodiments.

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246 (in certain embodiments), and an illustrative energy-based feedback process 248, as described herein. Note that while energy-based feedback process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Figure 3:
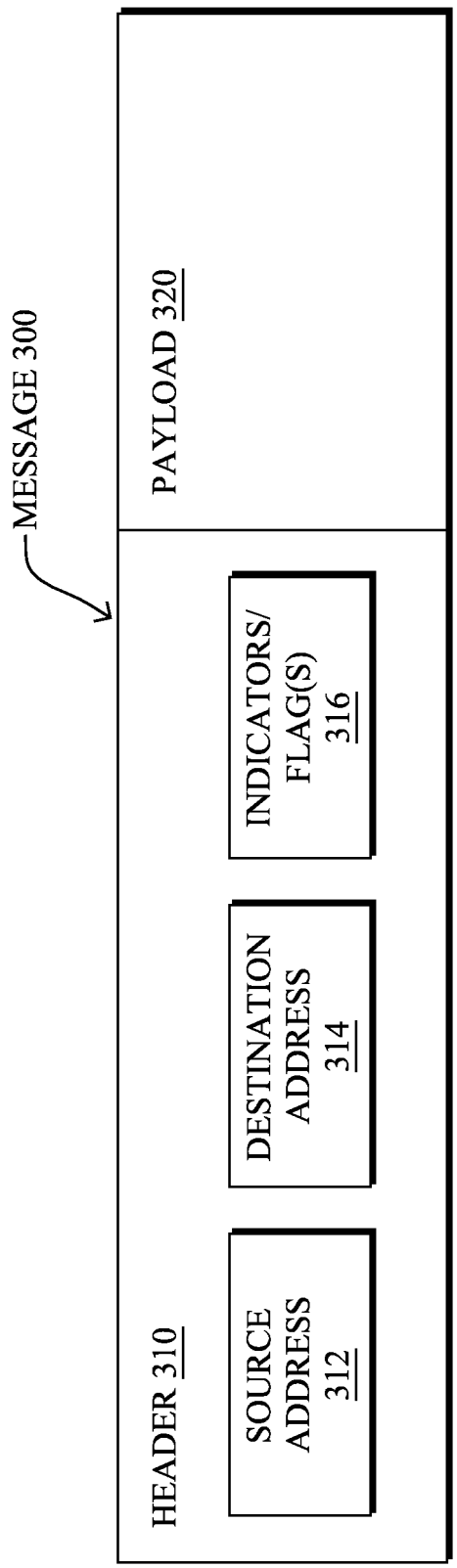
FIG. 3 illustrates an example message format.

Notably, FIG. 3 illustrates an example format for a message 300, e.g., a packet 140, which may be utilized by the device 200. In particular, as a simplified representation, the message 300 may have a header 310 used to transmit the message, and a payload 320 containing the data to be transmitted within the message. Illustratively, the header may, though need not, comprise a source address 312, a destination address 314, and in certain embodiments, one or more flags/indicators 316 as described herein.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, et al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP)

traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

As further noted above, various challenges are presented with LLNs, such as lossy links, low bandwidth, battery operation, low memory and/or processing capability, etc. For instance, large scale deployment of sensor networks has always faced the problem of providing a sustainable energy source to the sensor devices to operate. Though certain LLNs do have devices that are main powered ("plugged in"), often devices in LLNs are battery operated or energy-harvesters (e.g., solar, wind, etc.). In addition, main powered devices may lose power (an outage), at which time backup power (e.g., batteries) must be used for an often indeterminate length of time. Accordingly, one of the most important challenges to deployment of LLNs is minimizing the energy requirements of the devices and sustaining operational levels of energy.

Energy-Based Feedback

According to the techniques herein, receivers have the ability to use back-pressure when they detect that they do not have sufficient energy to receive the intended transmission(s), such as too many packets or too long a transmission, thus causing a routing change to take place in the network. In particular, the techniques apply energy-level-based backpressure on packet forwarding (too many packets, too long a packet, etc., given the amount of energy remaining at the device) in order to proactively conserve energy in a device. Note that while these techniques are beneficial regardless of whether the device is always on or is configured to periodically sleep, one particular embodiment described herein also related to a radio-triggered wake-up technique (e.g., with no required wake-up cycle), which provides further conservation of energy.

Specifically, according to one or more embodiments of the disclosure as described in detail below, a communication device of a communication network determines its available power level, and also estimates a power requirement to receive an expected transmission from a transmitter of the communication network. By determining whether the available power level is sufficient for the estimated power requirement, the device may correspondingly provide feedback to the transmitter regarding whether the available power level is sufficient for the estimated power requirement (e.g., if insufficient, either ignoring the transmission or returning an explicit reply). In addition, in another embodiment, further power conservation may be afforded through a radio-triggered wake-up mechanism.

Illustratively, the techniques described herein may be performed by hardware, software, and/or firmware, such as in accordance with the energy-based feedback process 248/248a, which may contain computer executable instructions executed by the processor 220 (or independent processor of interfaces 210) to perform functions relating to the novel techniques described herein. For example, the energy-based feedback process may control reception via the network interfaces 210, and may also be capable of determining power levels of the power supply 260, or else receiving an indication of the power levels.

Figure 4A:
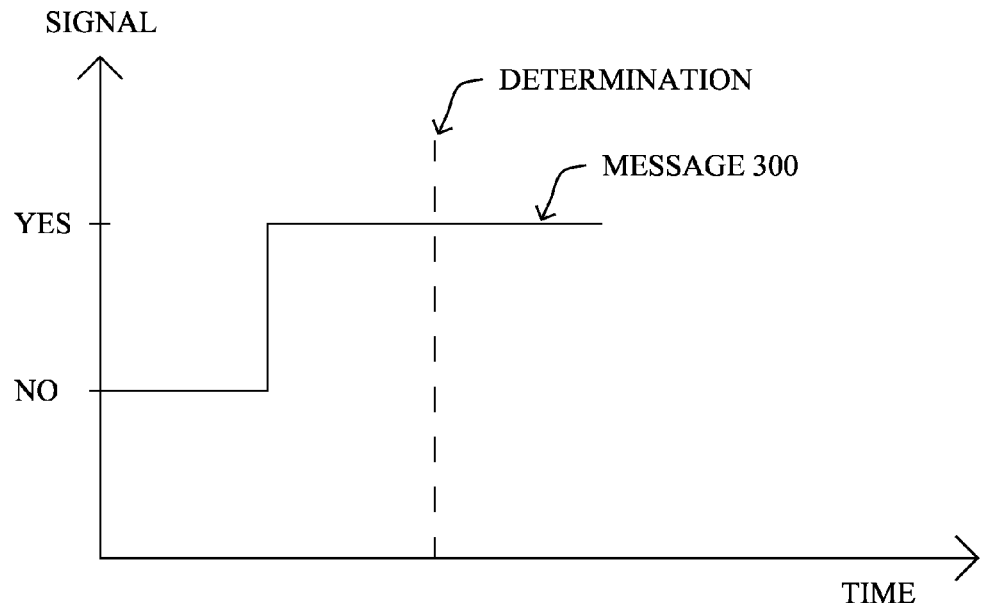
FIGS. 4A-4B illustrate example graphs of expected transmissions.
Figure 4B:
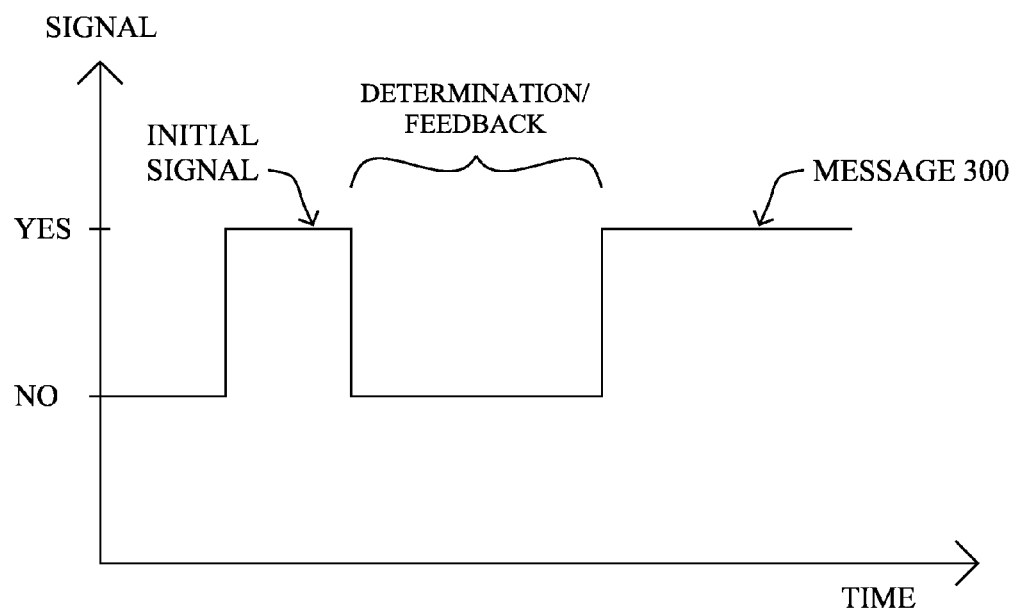

Operationally, a device 200 may first determine a trigger to check its power level. For example, the device may begin receiving a transmission, or else may receive an indication of an impending transmission. As shown in FIG. 4A, for example, upon initial receipt of a message (e.g., a packet 300), while the message is still being received, the header may be processed to determine a length of the packet, a number of packets within a chain of related packets, or other indications (field 316) useful for determining an expected amount of time a receiver will need to be active to acquire the entire anticipated transmission. Alternatively, as shown in FIG. 4B, the first trigger may take the form of an initial message that carries (e.g., in payload 320) an indication of a subsequent message or chain of messages to follow, giving the device time to process the shorter request, and to provide feedback before the start of the following message(s) as described below, accordingly.

In response to the trigger, or else merely in response to a periodic determination, the device may determine an available power level of its power supply 260. For instance, the device 200 may be powered by a battery, an energy-harvesting capacitor, or else may be temporarily powered as such during a power failure of a main (plug in) power supply.

Figure 5:
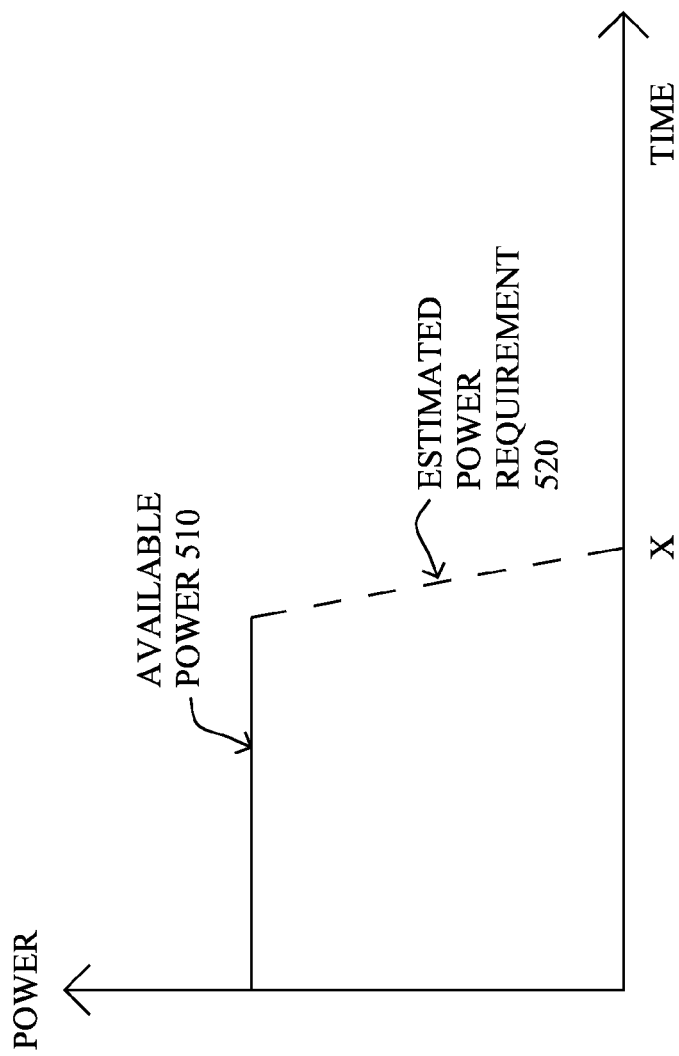
FIG. 5 illustrates an example graph of power levels.

FIG. 5 illustrates an example simplified graph of power levels. For instance, the available power level 510 may be determined based on circuitry that will be understood by those skilled in the art, and relayed to the energy-based feedback process 248. Based on an actual trigger, the device may then estimate a power requirement 520 to receive an expected transmission at the device from a transmitter of the communication network. For example, estimating the power requirement may be based more specifically on determining the length of the transmission or a number of packets within the transmission, such as described above. Accordingly, the device may determine whether the available power level 510 is sufficient for the estimated power requirement 520, that is, whether there is enough stored or accumulated power at the device to complete the task at hand.

Figure 6A:
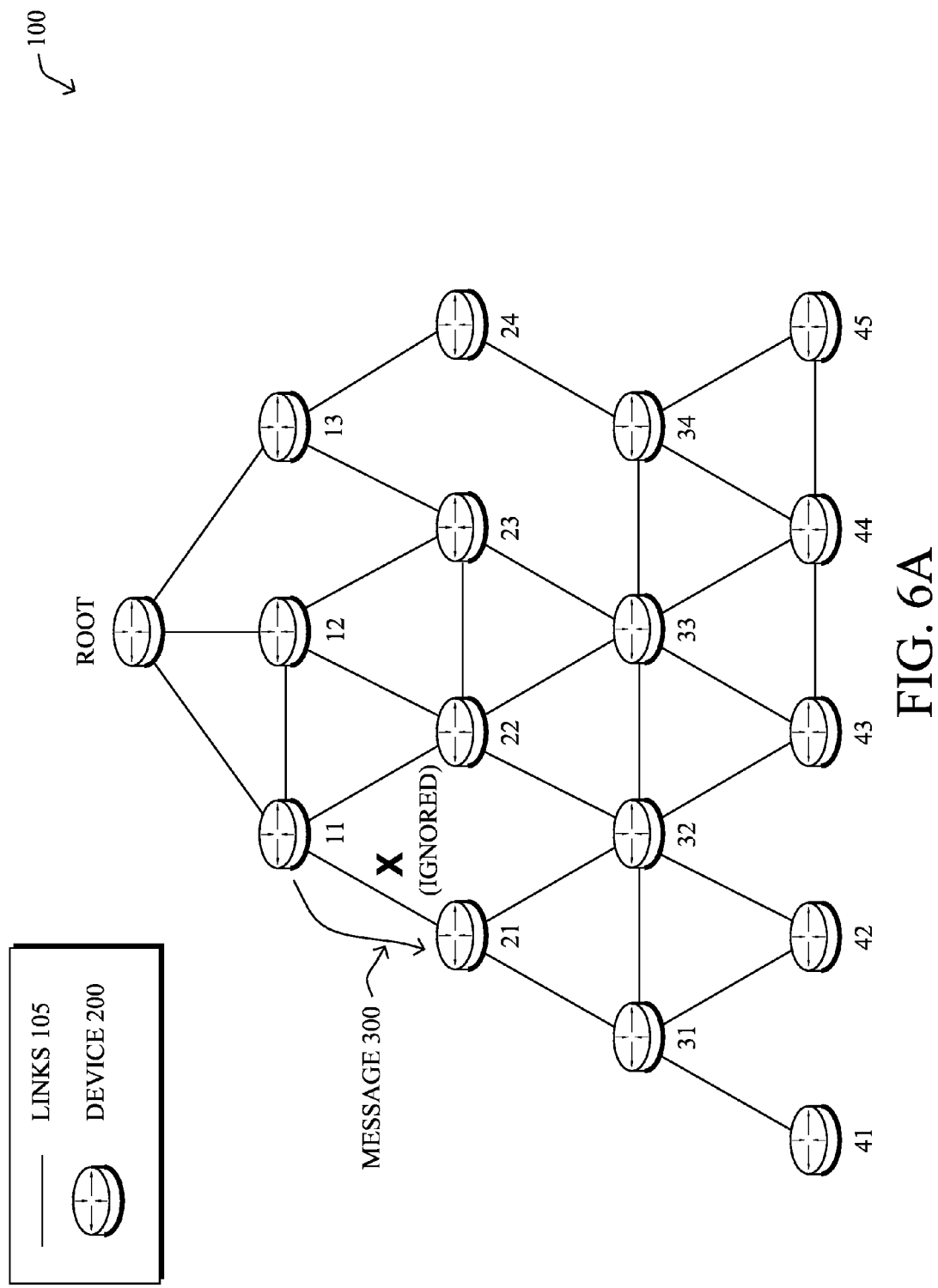
FIGS. 6A-6B illustrate an example of feedback operation.
Figure 6B:
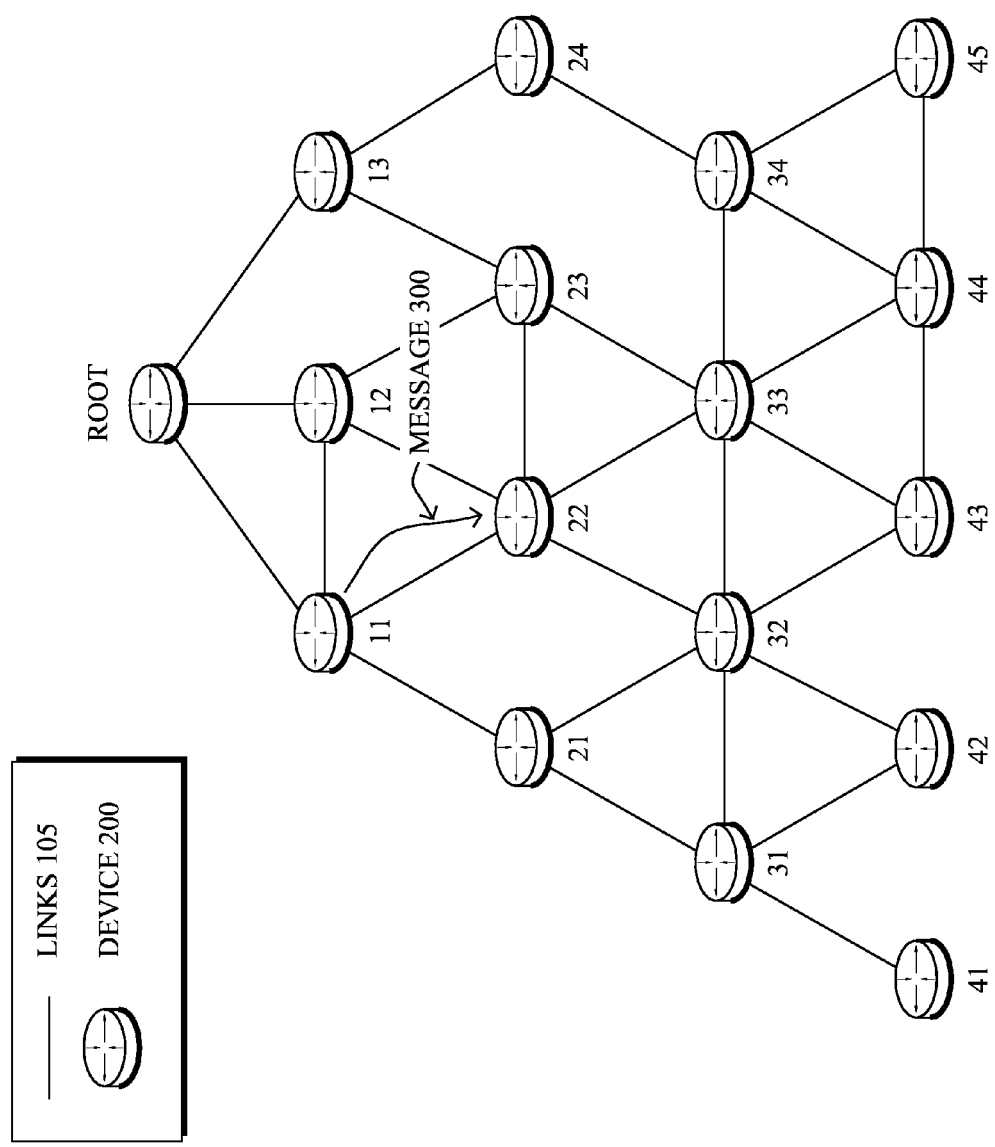

According to the techniques herein, based on whether the available power level is sufficient for the estimated power requirement, the device may then provide feedback to the transmitter, e.g., returning to a sleep mode, turning the receiver off, or returning a signal to report that it cannot process the packet. For instance, as shown in FIG. 6A, if the device ignores the subsequent transmission without acknowledgment, thus providing an implicit feedback that the available power level is insufficient, then the transmitter may decide to reroute the transmission via another device (e.g., adapting its preferred next-hop selection), as shown in FIG. 6B (assuming, that is, that the transmission was not intended for the ignoring device). In this manner, a sort of abortion of the reception occurs, thus acting as a back pressure mechanism to being used as a routing device when power levels don't permit.

Figure 7C:
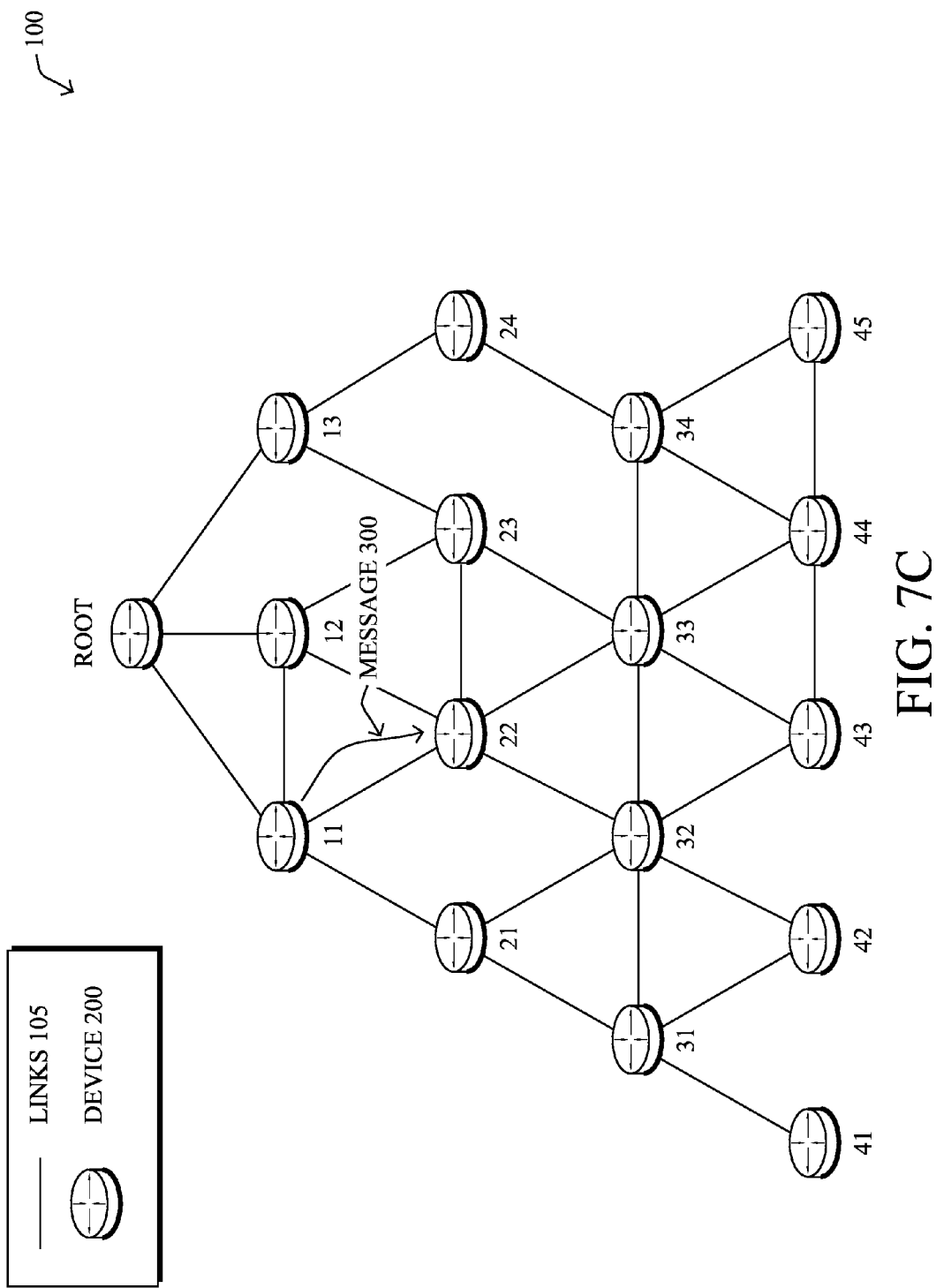

As an alternative example, FIG. 7A illustrates an instance where the device is able to receive an initial message (such as in accordance with the request/response exchange timing shown in FIG. 4B), and may then return a reply message 740 as in FIG. 7B. This allows the device to provide an explicit feedback that the available power level is sufficient or insufficient. If insufficient, then as shown in FIG. 7C, the transmitter may again decide to reroute the transmission via another device. Note that such a reply 740 may be immediate (e.g., where a delay for the response is available as in FIG. 4B), or else may be returned after a certain amount of time, e.g., after not listening to the message, but after the expected transmission time of the message to indicate why the device did not receive the intended transmission. The reply 740 may simply indicate the insufficient power level, or else may specifically indicate additional information, such as indicating that the device receives too many packets according to its level of energy (e.g., it is battery operated or using energy scavengers/harvesters). Note that the reply 740 in one or more embodiments may actually be a acknowledgment message for a previous successful transmission reception, but with various fields indicating whether future messages may require more energy than what is expected to be available at the device.

Different from a device merely running out of power and stopping any reception activity, the intelligence afforded from the described techniques allows a device to conserve its remaining energy, rather than deplete it. An example benefit is perhaps to allow high priority packets at a later time (e.g., to stop using the device as a router for traffic, but still saving enough energy for the device to turn on and send an alarm if necessary in the future.), or perhaps for the continued transmission of sensed data, rather than depleting the energy through the routing or forwarding other devices' data.

Figure 8:
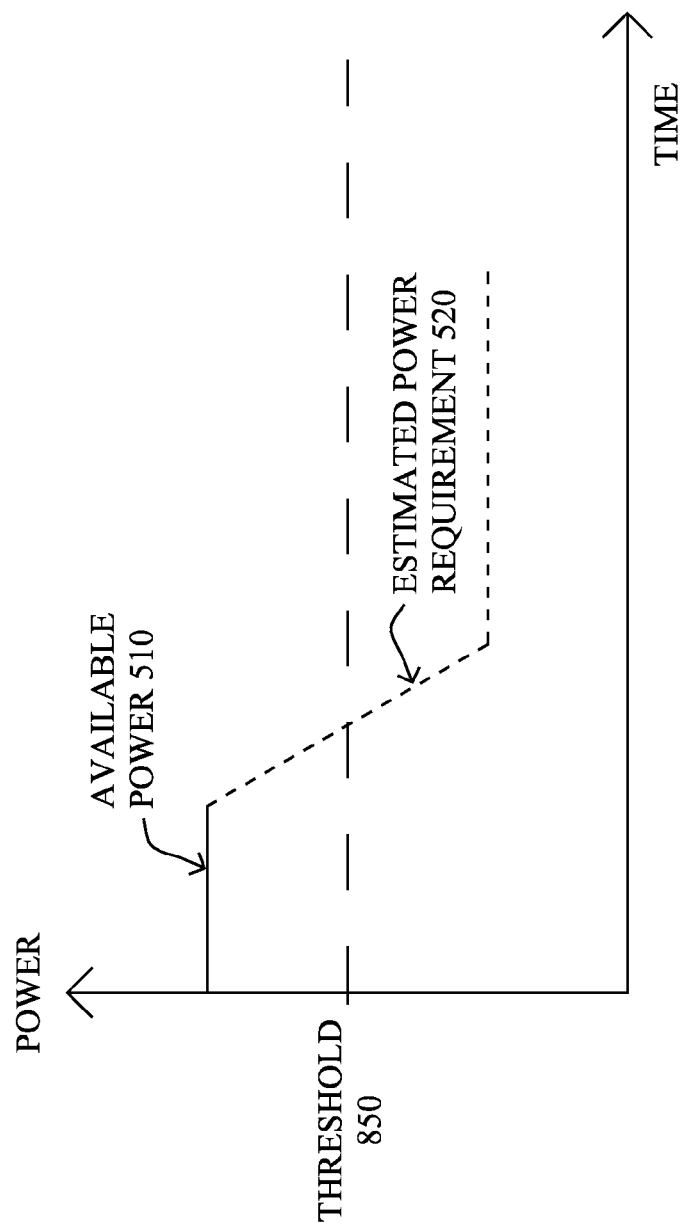
FIG. 8 illustrates an example graph of power levels and thresholds.

As such, FIG. 8 illustrates an example graph of power levels and various sufficiency thresholds. For example, determining whether the available power level is sufficient for the estimated power requirement may be based on a minimum threshold power level 830 approximate to enough power to transmit one or more messages from the device. Alternatively, the minimum threshold power level 830 may reflect the energy needed for the device to continue acting as a router for the communication network. Sufficient power described herein thus becomes sufficient not only to physically complete the action, but to physically complete the action with a certain level of remaining energy still available.

Note that in one or more particular embodiments, determining whether the available power level is sufficient for the estimated power requirement may still be based on some minimum threshold power level, but if it is determined that the expected transmission is a critical transmission (or else destined to the device itself), then the device may simply attempt to receive and process the expected transmission. For example, if the device would cross the threshold below acting as a router, the criticality of the message may dictate that the device acts as a router anyway. Alternatively, if the message is a critical actuator control message to shut down a system (e.g., a gas line), then it would be particularly important to try to receive the control command and to thus act on it.

In accordance with one or more particular embodiments herein, certain techniques are also described that provide for power-saving wake-up control of the devices 200. In particular, in networks that require multi-hop communication, certain devices must be activated as bidirectional communicators, in order to relay transmissions to and from devices further away from a base station or central controller. As is well known, in order to be capable of low-latency bidirectional communication, a device must keep its receiver is in the ON state at all times. This is required so that the device is able to receive the requests/messages from other devices and respond to them immediately. The disadvantage of this method is that the receiver continuously draws energy in this state, thereby pushing the power requirements of the device beyond what can be provided by energy harvesting modules or even batteries.

There are many specific protocols (e.g., particularly for sensor networks) that do not require the receiver to be ON at all times. However, these protocols operate based on a periodic sleep-wakeup schedule (cycling the device between a sleep mode and an awake mode of operation), require additional overhead to add preamble upon sending packets and cannot meet the low-latency requirements, and will eventually drain the remaining power supply. If the periodicity at which they wake up is too low, each sent packet must add a long enough preamble, which is only viable in the network when the traffic load is very low, i.e., when sensors send packet very rarely. If the periodicity is too high, the energy is depleted at an even greater rate.

According to one or more specific embodiments herein, therefore, a scheme is described for using a passive wake-up system in addition to the bidirectional transceiver where devices may be equipped with a passive radio frequency device to generate a wake-up pulse only if it receives a signal of a particular frequency with a specific envelope.

Figure 9:
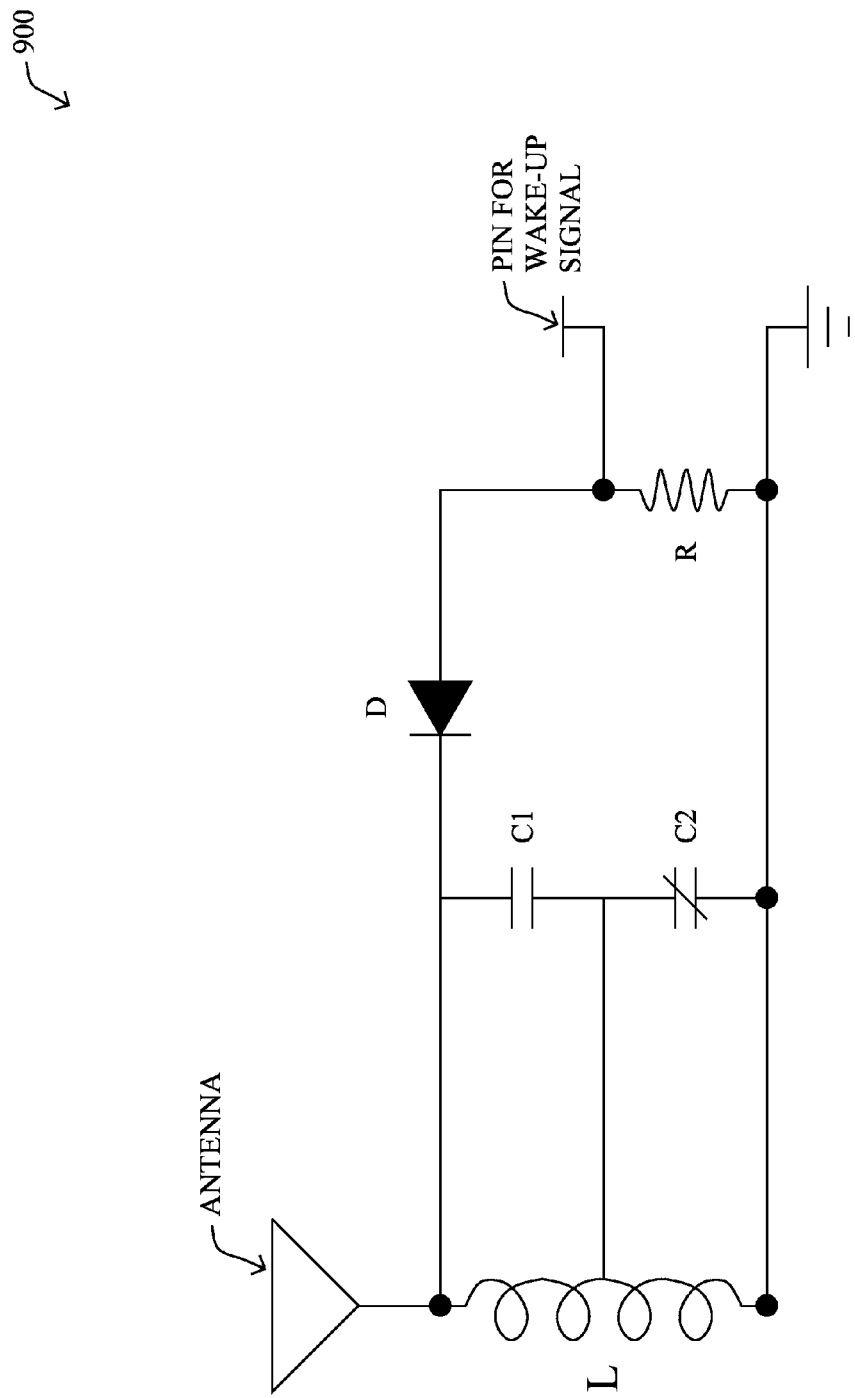
FIG. 9 illustrates an example radio-triggered wake-up circuit.

FIG. 9 illustrates an example radio-triggered wake-up circuit 900 that is generally configured to receive a burst of radio frequency (RF) energy (while the device/process is in a sleep mode), where the RF energy is intended to wake up the process. In particular, an antenna (e.g., a dipole antenna) may provide RF signals to a tunable LC circuit, comprising an inductor L, capacitors C1 and C2, a diode D, and a resister R, arranged as shown. The circuit 900, e.g., C2, may be specifically tuned for a certain resonance frequency between its cmin and cmax to provide a corresponding voltage at the wake-up pin. In this manner, the circuit may be tuned to uniquely identify a unique frequency ID at a given device. In other words, the circuitry is configured to convert the received RF energy into a wake-up signal, without using any power of the power supply, to wake the process from the sleep mode. (Note that the example circuitry shown is merely an illustration, and other suitable circuits may be designed with essentially the same result.)

In order to keep the energy requirements to a minimum, the device may be configured to sleep as much as possible, e.g., whenever it is not required to provide any data (as a sensor device). Low-latency can be achieved if the device can be woken up from this sleep state as soon as any other device needs to communicate with it. The techniques herein, therefore, allow for a passive wake-up system that generates a wake-up pulse to the corresponding pin only if it receives a signal of a particular frequency with a specific envelope. In particular, since this device (circuit 900) is passive, it does not consume any energy for its operation. That is, since the purpose is to save energy, it does not require any power source to decode modulated RF signals to uniquely identify a device. Notably, such a wake-up signal may be in addition to a sleep/ wake duty cycle, or else the device may be configured to only be awakened from the sleep mode by the wake-up signal.

Figure 10A:
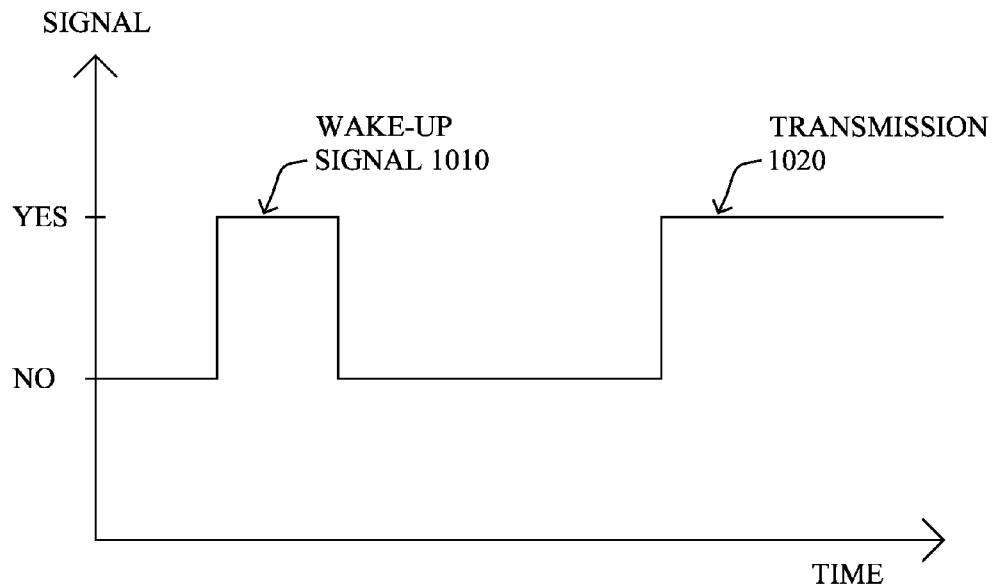
FIGS. 10A-10B illustrate an example of radio-triggered wake-up timing.
Figure 10B:
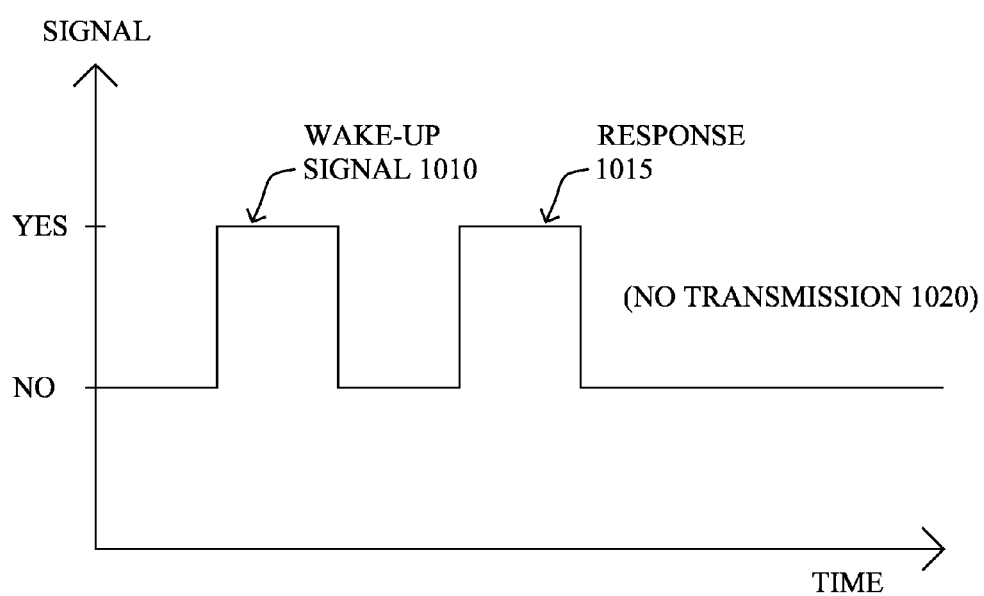

The wake-up pulse is used to trigger the other modules in the device (e.g., process 248), thus waking it up from the sleep state. Those skilled in the art will appreciate that the envelope that will trigger the device is akin to the MAC address. Hence, as shown in FIG. 10A if a device A wants to communicate with a device B, then device A has to send the signal envelope 1010 that corresponds to device B before it starts transmitting the actual data 1020 (after waiting for the expiration of a timer). Note that in accordance with the embodiment described above with reference to FIG. 4B, the initial signal envelope 1010 may be the initial message sent to the device to indicate an impending transmission, at which time the device, now awake, may determine the available power supply, compare it to the expected power requirement, and provide feedback to the transmitter, accordingly. For example, as shown in FIG. 10B, the signal 1010 may prompt the feedback response 1015, such that the transmitter may determine that the transmission 1020 may be better suited for another device (e.g., with higher available power levels).

Figure 11A:
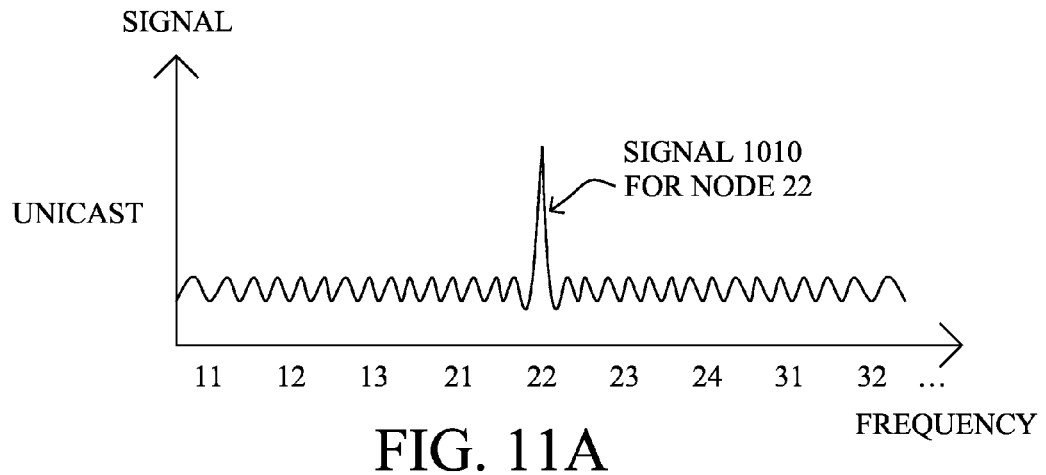
FIGS. 11A-11C illustrate examples of radio-triggered wake-up signals.
Figure 11B:
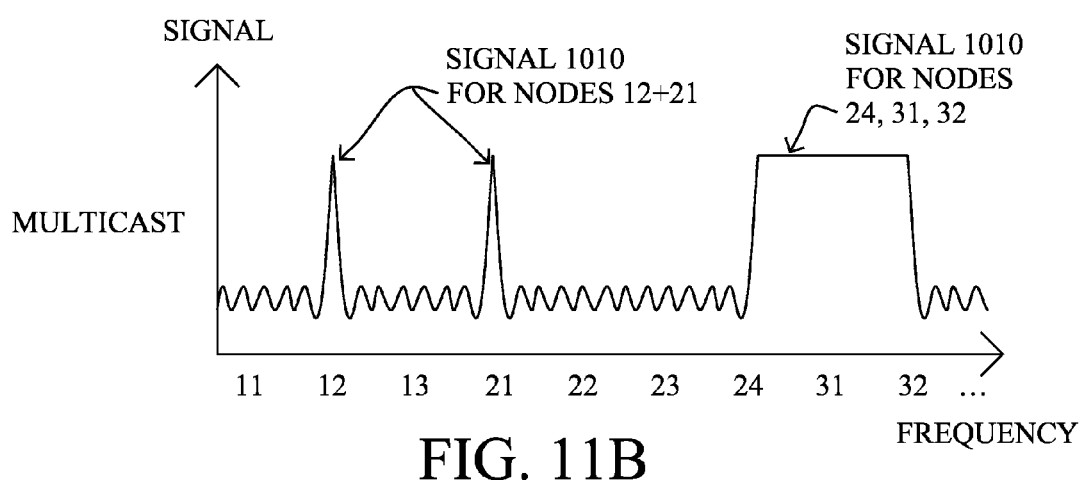
Figure 11C:
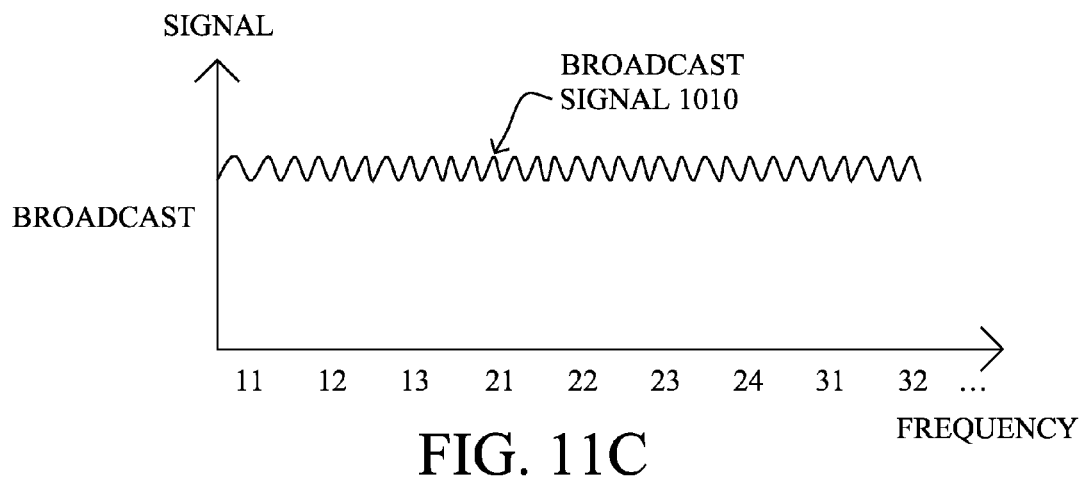

Since the circuitry 900 is configured such that the wake-up signal is generated in response only to RF energy specifically tuned to the particular device, to wake up a particular device, the RF energy must then be specifically tuned to the desired device, accordingly. As an example, FIGS. 11A-11C illustrate examples of radio-triggered wake-up signals. As shown in FIG. 11A, for instance, each device in a network is associated with a particular frequency (or frequency range, depending upon the sensitivity available from the circuitry 900). To reach a particular device, the signal 1010 must be aligned with the corresponding frequency. (Note that the particular frequency mapping may be stored in a database, pre-configured, etc.)

For a multicast scenario, one can tune multiple devices with a same frequency ID. Alternatively, as shown in FIG. 11B, the transmitter, if so capable, may transmit the signal 1010 across a plurality of select frequencies, e.g., simultaneously or in close succession, in order to awaken the corresponding multicast devices. Similarly, for broadcast, each device may also be configured to wake-up in response to a shared "broadcast address" frequency ID (e.g., a separately tuned circuit), or, as shown in FIG. 11C, the transmitter may transmit signal 1010 across all (relevant) frequencies used in the network.

Note that in one enhanced embodiment, the circuitry 900 may be configured to allow for the signal 1010 to indicate the size of the packet to be transmitted. For instance, rather than a device having a single frequency ID for its circuitry 900, a range of frequencies may be used, where the different locations within the range indicate the general length of the subsequent transmission to follow. As an example, if a frequency range of "1-10" is assigned to a device, signaling the device at frequency "1" may indicate that the device should awaken for a shorter message, while signaling the device at frequency "10" may indicate that the device should awaken for a longer message. Other examples are available, and the embodiment discussed is merely one representative possibility.

Figure 12:
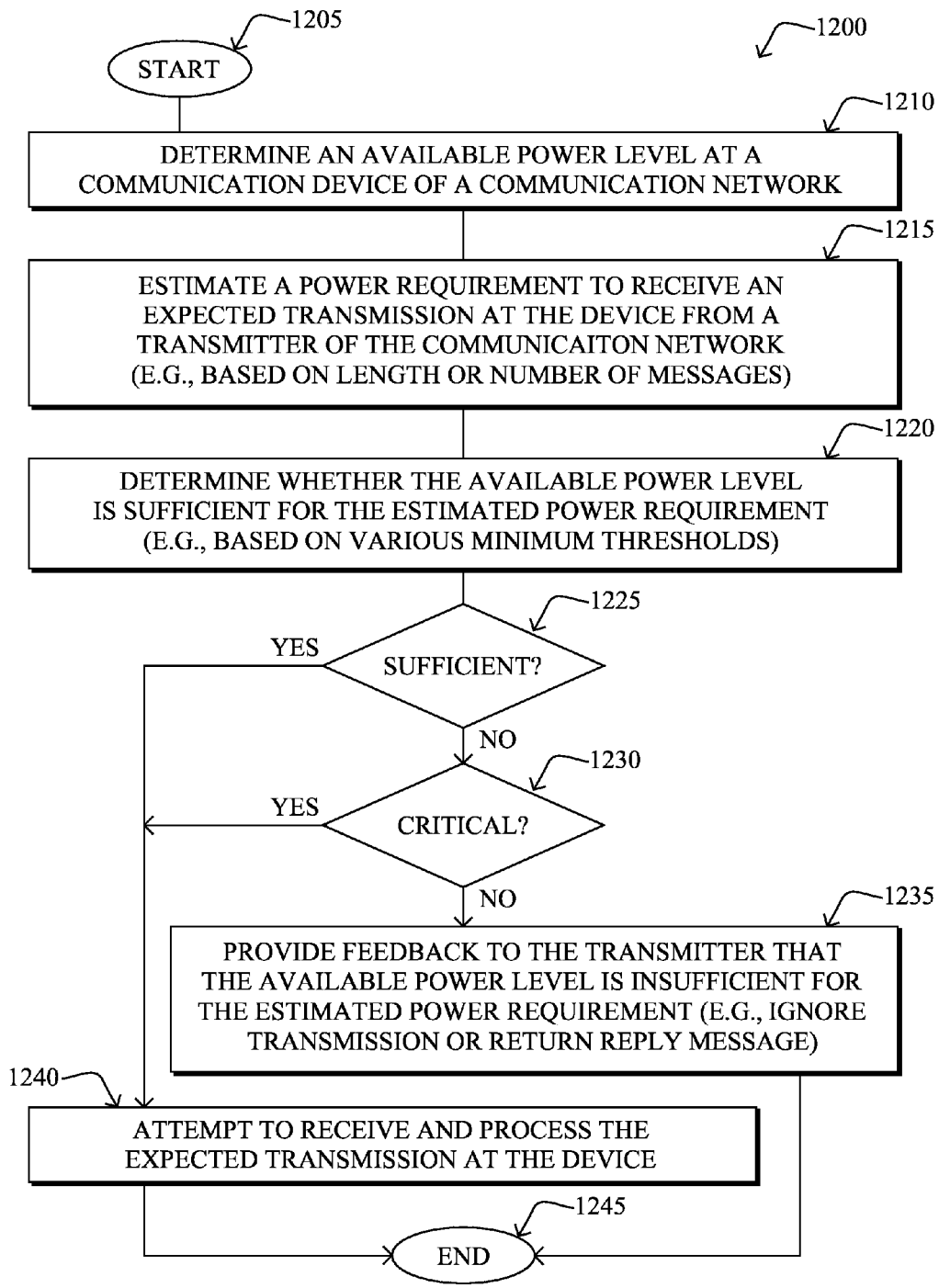
FIG. 12 illustrates an example simplified procedure for energy-based feedback.

FIG. 12 illustrates an example simplified procedure for energy-based feedback for intended message reception in accordance with one or more embodiments described herein. The procedure 1200 starts at step 1205, and continues to step 1210, where, as described in greater detail above, a device 200 determines an available power level, and then in step 1215, may estimate a power requirement to receive an expected transmission at the device from a transmitter of the communication network. For example, as described above, the estimation may be based on the length or number of messages. In step 1220, the device may correspondingly determine whether the available power level is sufficient for the estimated power requirement, e.g., based on various minimum thresholds as mentioned above. If the energy is not sufficient in step 1225, and not critical in step 1230, then in step 1235 the device may provide feedback to the transmitter that the available power level is insufficient for the estimated power requirement. For instance, as noted above, the device may ignore the transmission (implicit feedback) or return reply message (explicit feedback). Alternatively, if there is sufficient power or the message is critical, then in step 1240 the device may attempt to receive and process the expected transmission at the device, accordingly. The procedure ends in step 1245, until further power levels need to be determined for future transmissions.

Figure 13:
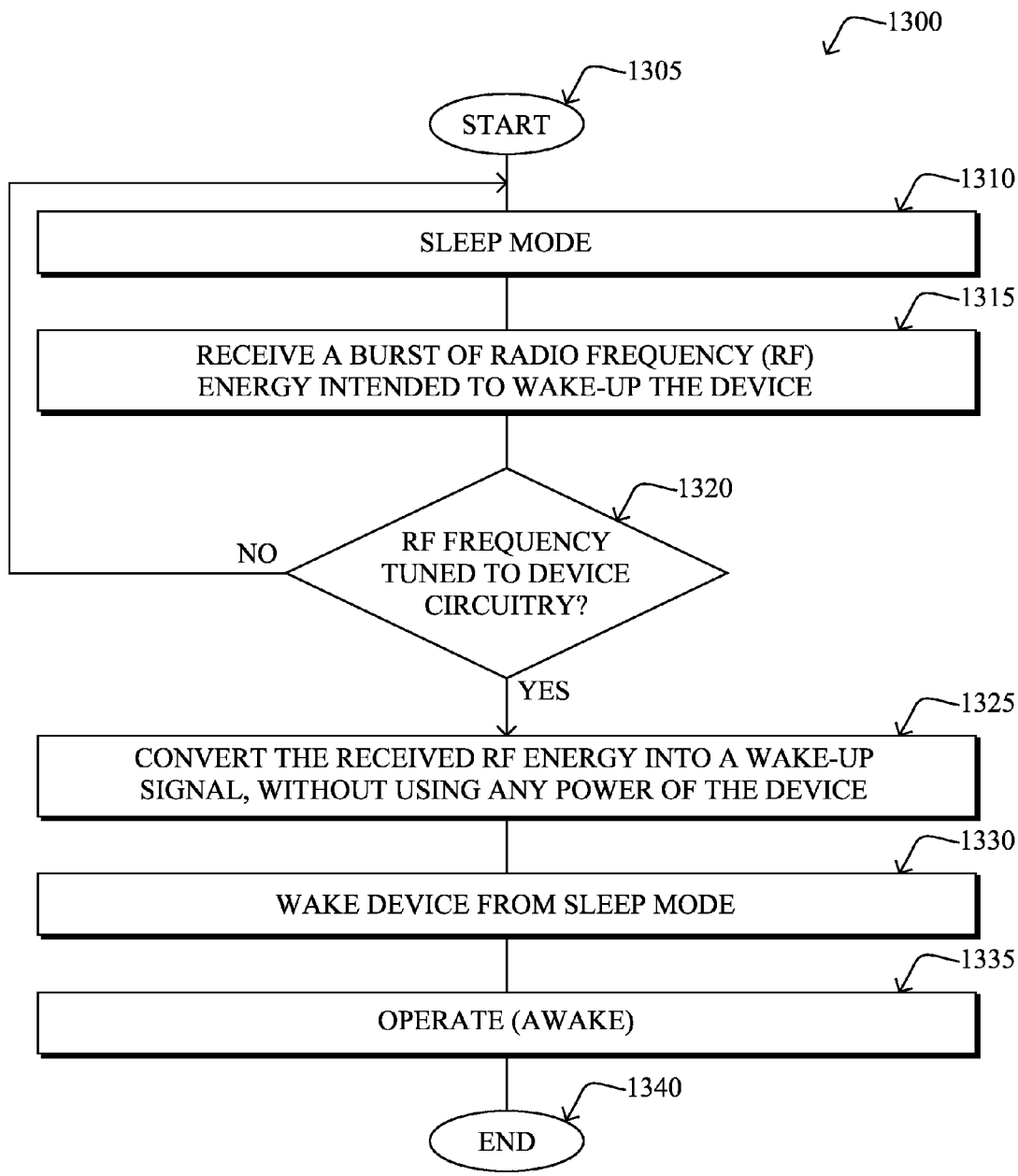
FIG. 13 illustrates an example simplified procedure radio-triggered wake-up.

In addition, FIG. 13 illustrates an example simplified procedure for radio-triggered wake-up in accordance with one or more embodiments described herein (which, notably, may take place entirely in hardware circuitry 900). The procedure 1300 starts at step 1305, and continues to step 1310, where, as described in greater detail above, the device (the process/processor) awaits in sleep mode, until the circuitry 900 receives a burst of RF energy intended to wake up the device in step 1315. If in step 1320 the RF frequency is tuned to the device circuitry (e.g., unicast, multicast, or broadcast, as mentioned above), then in step 1325 the energy is converted into a wake-up signal, without using any power of the device, and the device is woken from the sleep mode in step 1330 to operate in step 1335, accordingly. The procedure 1300 ends in step 1340, until at some point the device returns to sleep mode (e.g., timer based and/or upon completion of a subsequent transmission/action).

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

The novel techniques described herein, therefore, provide for energy-based feedback for intended message reception in a communication network. In particular, the techniques allow power-constrained devices to provide energy-based feedback to transmitters, thus making the overall network more flexible and configurable while prolonging the life of the network when using non main-powered nodes. In addition, the embodiments described above with relation to radio-based wake-up triggering offer even greater energy conservation than the feedback mechanisms alone.

While there have been shown and described illustrative embodiments that provide for energy-based feedback for intended message reception in a communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks looking to conserve energy. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining an available power level at a communication device of a communication network;
   estimating a power requirement to receive an expected transmission at the device from a transmitter of the communication network;
   determining whether the available power level is sufficient for the estimated power requirement; and
   providing feedback to the transmitter regarding whether the available power level is sufficient for the estimated power requirement, wherein
   when the available power level is insufficient for the estimated power requirement, the feedback triggers the transmitter to adjust a routing of the expected transmission.

2. The method as in claim 1, further comprising:
   receiving a burst of radio frequency (RF) energy at the device while the device is in a sleep mode, the RF energy intended to wake up the device; and
   converting the received RF energy into a wake-up signal, without using any power of the device, to wake the device from the sleep mode, wherein the device determines whether the available power level is sufficient for the estimated power requirement and provides feedback while awake.

3. The method as in claim 2, wherein the RF energy is specifically tuned to wake up only the particular device.

4. The method as in claim 2, wherein the device is configured to only be awakened from the sleep mode by the wake-up signal.

5. The method as in claim 1, wherein estimating the power requirement to receive the expected transmission comprises determining one of either a length of the transmission or a number of packets within the transmission.

6. The method as in claim 1, wherein providing feedback comprises:
   ignoring the transmission without acknowledgment to provide an implicit feedback that the available power level is insufficient.

7. The method as in claim 1, wherein providing feedback comprises:
   returning a reply message to provide an explicit feedback that the available power level is insufficient.

8. The method as in claim 1, wherein determining whether the available power level is sufficient for the estimated power requirement is based on a minimum threshold power level approximate to enough power to transmit one or more messages from the device.

9. The method as in claim 1, wherein determining whether the available power level is sufficient for the estimated power requirement is based on a minimum threshold power level for the device to act as a router.

10. The method as in claim 1, wherein determining whether the available power level is sufficient for the estimated power requirement is based on a minimum threshold power level, the method further comprising:
    determining that the expected transmission is a critical transmission; and
    in response, attempting to receive and process the expected transmission at the device.

11. The method as in claim 1, further comprising:
    cycling the device between a sleep mode and an awake mode of operation.

12. The method as in claim 1, wherein the device is powered by one of either a battery or energy-harvesting circuitry.

13. An apparatus, comprising:
    a power supply having an available power level;
    one or more network interfaces to communicate within a communication network;
    a processor coupled to the network interfaces and adapted to execute one or more processes; and
    a memory configured to store a process executable by the processor, the process when executed operable to:
    determine the available power level;
    estimate a power requirement to receive an expected transmission from a transmitter of the communication network;
    determine whether the available power level is sufficient for the estimated power requirement; and
    provide feedback to the transmitter regarding whether the available power level is sufficient for the estimated power requirement, wherein
    when the available power level is insufficient for the estimated power requirement, the feedback triggers the transmitter to adjust a routing of the expected transmission.

14. The apparatus as in claim 13, further comprising:
    radio-triggered wake-up circuitry configured to receive a burst of radio frequency (RF) energy while the process is in a sleep mode, the RF energy intended to wake up the process, the circuitry further configured to convert the received RF energy into a wake-up signal, without using any power of the power supply, to wake the process from the sleep mode, wherein the process determines whether the available power level is sufficient for the estimated power requirement and provides feedback while awake.

15. The apparatus as in claim 14, wherein the circuitry is configured such that the wake-up signal is generated in response only to RF energy specifically tuned to the particular device.

16. The apparatus as in claim 14, wherein the process is configured to only be awakened from the sleep mode by the wake-up signal.

17. The apparatus as in claim 13, wherein the process when executed to estimate the power requirement to receive the expected transmission is further operable to:
    determine one of either a length of the transmission or a number of packets within the transmission.

18. The apparatus as in claim 13, wherein the process when executed to provide feedback is further operable to one of either i) ignore the transmission without acknowledgment to provide an implicit feedback that the available power level is insufficient, or ii) return a reply message to provide an explicit feedback that the available power level is insufficient.

19. The apparatus as in claim 13, wherein the process when executed to determine whether the available power level is sufficient for the estimated power requirement is based on a minimum threshold power level approximate to enough power to transmit one or more messages from the apparatus.

20. The apparatus as in claim 13, wherein the process when executed to determine whether the available power level is sufficient for the estimated power requirement is based on a minimum threshold power level for the apparatus to act as a router.

21. The apparatus as in claim 13, wherein the process when executed to determine whether the available power level is sufficient for the estimated power requirement is based on a minimum threshold power level, the process when executed further operable to:
   determine that the expected transmission is a critical transmission; and
   in response, attempt to receive and process the expected transmission.

22. The apparatus as in claim 13, wherein the process when executed is further operable to:
   cycle between a sleep mode and an awake mode of operation.

23. The apparatus as in claim 13, wherein the power supply is one of either a battery or energy-harvesting circuitry.

24. A tangible, non-transitory, computer-readable media having software encoded thereon, the software, when executed by a processor on a communication device of a communication network, operable to:
   determine an available power level at the communication device;
   estimate a power requirement to receive an expected transmission at the device from a transmitter of the communication network;
   determine whether the available power level is sufficient for the estimated power requirement; and
   provide feedback to the transmitter regarding whether the available power level is sufficient for the estimated power requirement, wherein
   when the available power level is insufficient for the estimated power requirement, the feedback triggers the transmitter to adjust a routing of the expected transmission.

25. The computer-readable media as in claim 24, wherein the device comprises radio-triggered wake-up circuitry configured to receive a burst of radio frequency (RF) energy while the processor is in a sleep mode, the RF energy intended to wake up the process, the circuitry further configured to convert the received RF energy into a wake-up signal, without using any power of the device, to wake the processor from the sleep mode, wherein the processor determines whether the available power level is sufficient for the estimated power requirement and provides feedback while awake.

* * * * *